(12) United States Patent
Chen et al.

(10) Patent No.: US 6,824,311 B2
(45) Date of Patent: Nov. 30, 2004

(54) SELF-CONTAINED FIBER OPTIC CONNECTOR MODULE

(75) Inventors: Wenzong Chen, Naperville, IL (US); Jeffrey A. Matasek, Cedarburg, WI (US); Igor Grois, Northbrook, IL (US)

(73) Assignee: Molex Incorporated, Lisle, IL (US)

(*) Notice: Subject to any disclaimer, the term of this patent is extended or adjusted under 35 U.S.C. 154(b) by 0 days.

(21) Appl. No.: 10/403,948

(22) Filed: Mar. 31, 2003

(65) Prior Publication Data

US 2003/0223703 A1 Dec. 4, 2003

Related U.S. Application Data

(63) Continuation of application No. 09/455,621, filed on Dec. 7, 1999, now Pat. No. 6,715,931.

(51) Int. Cl.[7] .................................................. G02B 6/36
(52) U.S. Cl. ........................................................ 385/78
(58) Field of Search .............................. 385/54, 55, 69, 385/70, 76, 77, 984, 134, 136, 139

(56) References Cited

U.S. PATENT DOCUMENTS

| 4,715,675 A | * | 12/1987 | Kevern et al. | ................. 385/80 |
| 5,151,960 A | * | 9/1992 | Warner et al. | ................. 385/53 |
| 6,361,218 B1 | * | 3/2002 | Matasek et al. | ............. 385/60 |

* cited by examiner

Primary Examiner—Euncha P. Cherry
(74) Attorney, Agent, or Firm—Romi N. Bose

(57) ABSTRACT

A fiber optic connector module includes a ferrule terminated to at least one optical fiber. The ferrule includes a front mating end and a rear end. A pin keeper is engaged with the rear end of the ferrule. At least one alignment pin extends from the pin keeper through the ferrule and projects beyond the front mating end of the ferrule for operative association with a complementary connecting device. A pusher member is spaced behind the pin keeper. A spring is sandwiched between the pusher member and the pin keeper. The spring has opposite ends fixed to the pusher member and the pin keeper to hold the entire module together as a self-contained unit.

24 Claims, 20 Drawing Sheets

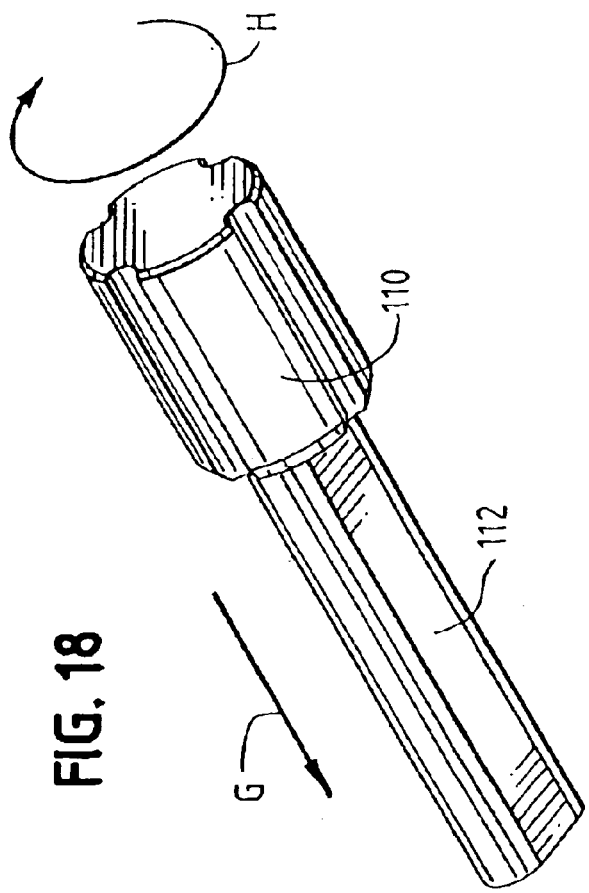
FIG. 18
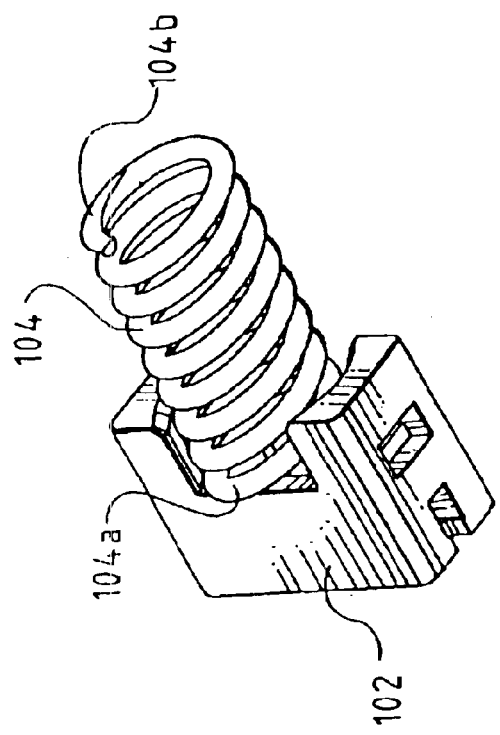

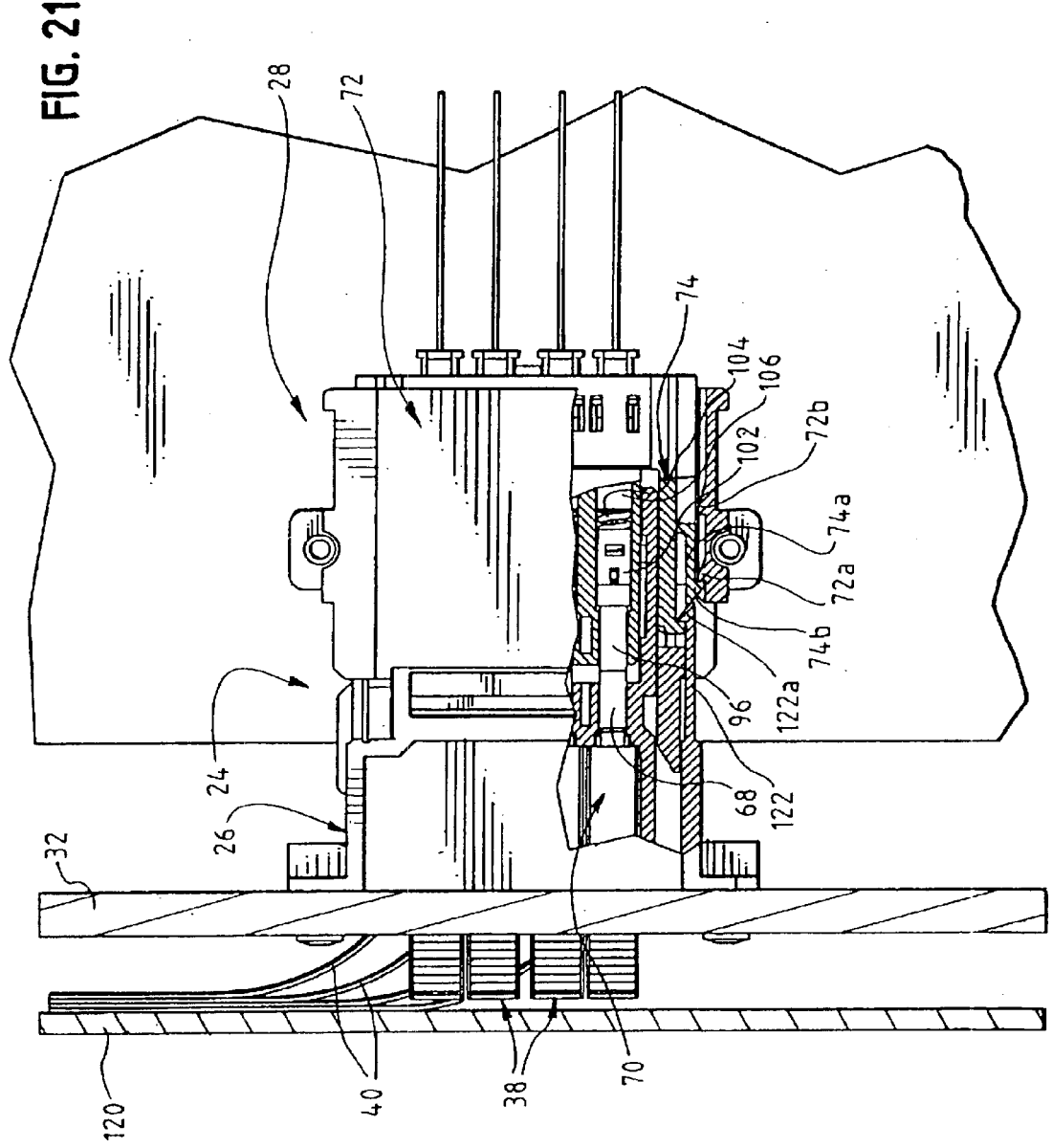

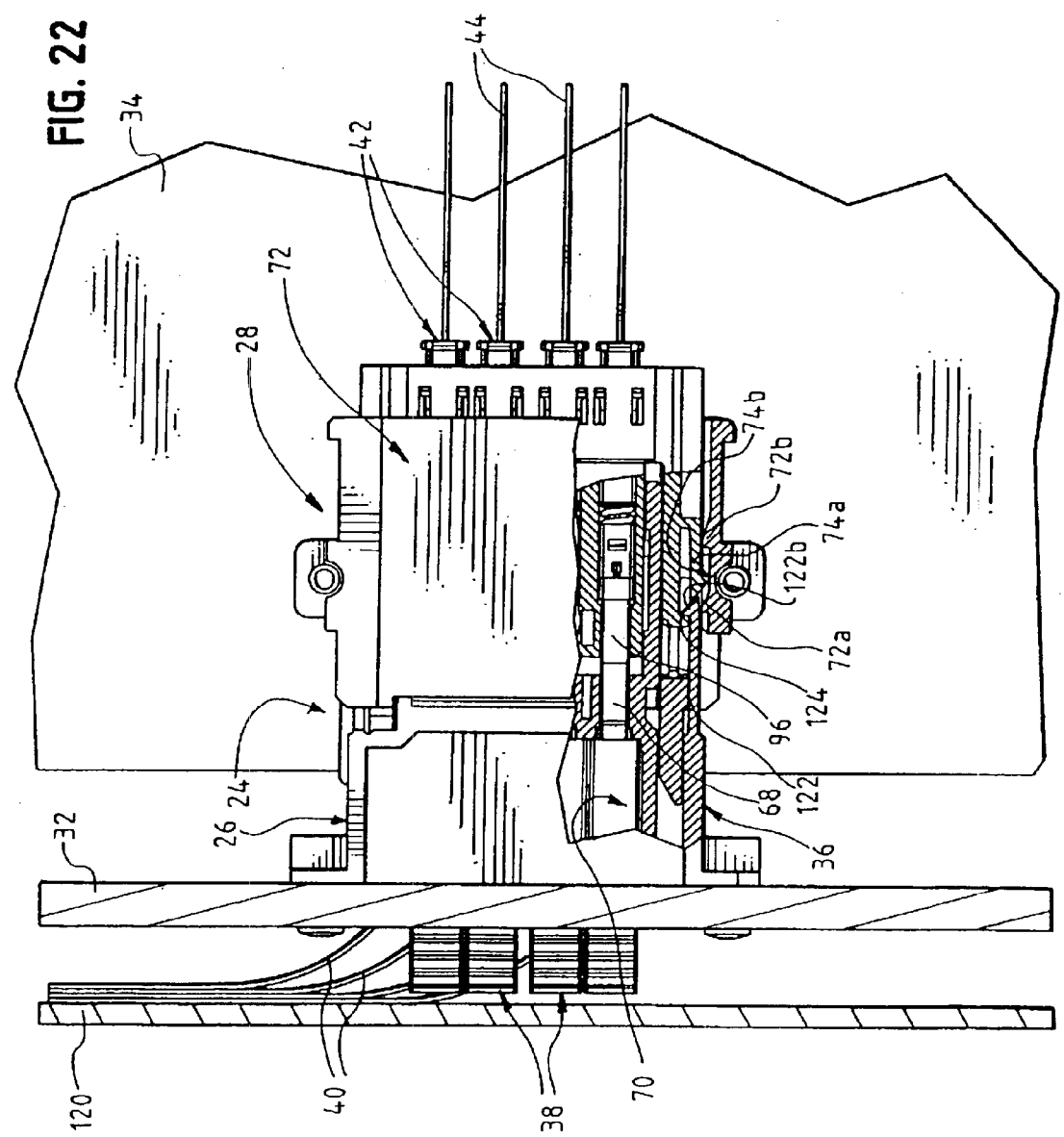

SELF-CONTAINED FIBER OPTIC CONNECTOR MODULE

This application is a continuation of U.S. patent application Ser. No. 09/455,621 filed on Dec. 7, 1999 now U.S. Pat. No. 6,715,931.

FIELD OF THE INVENTION

This invention generally relates to the art of fiber optic transmission and, particularly, to a self-contained fiber optic connector module.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. Such problems include properly and precisely placing a connector assembly on a substrate, such as a printed circuit board, accommodating misalignment of the connectors during mating, allowing relative floating movement between various components of the system and similar positional-type problems. Other problems simply involve efforts to simplify the design of connector assemblies. The present invention is directed to solving these problems and to providing various improvements in such connector assemblies.

SUMMARY OF THE INVENTION

An object, therefore, of the invention is to provide a new and improved fiber optic connector module.

In the exemplary embodiment of the invention, the module includes a ferrule terminated to at least one optical fiber. The ferrule includes a front mating end and a rear end. A pin keeper is engaged with the rear end of the ferrule. At least one alignment pin extends from the pin keeper through the ferrule and projects beyond the front mating end of the ferrule for operative association with a complementary connecting device. A pusher member is spaced behind the pin keeper. A spring is sandwiched between the pusher member and the pin keeper. The spring has opposite ends fixed to the pusher member and the pin keeper to hold the entire module together as a self-contained unit.

As disclosed herein, the pin keeper and the pusher member each has a receptacle means for receiving opposite ends of the spring. The spring is a coil spring, and the pin keeper and the pusher member having locking flanges within the receptacles thereof for locking with coils at opposite ends of the coil spring.

Other features of the invention include the pusher member having latch means for latching the module in engagement with the complementary connecting device. Preferably, the coil spring is generally oval in cross-configuration to facilitate locking the spring to the locking flanges of the pin keeper and the pusher member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 18 is a perspective view showing the assembly of the coil spring to the pin keeper of FIG. 16;

FIGS. 20–22 are sequential top plan views, partially broken away, showing the mating of the mating connector assembly of FIGS. 1–3.

DETAILED DESCRIPTION OF THE PREFERRED EMBODIMENT

Figure 1:
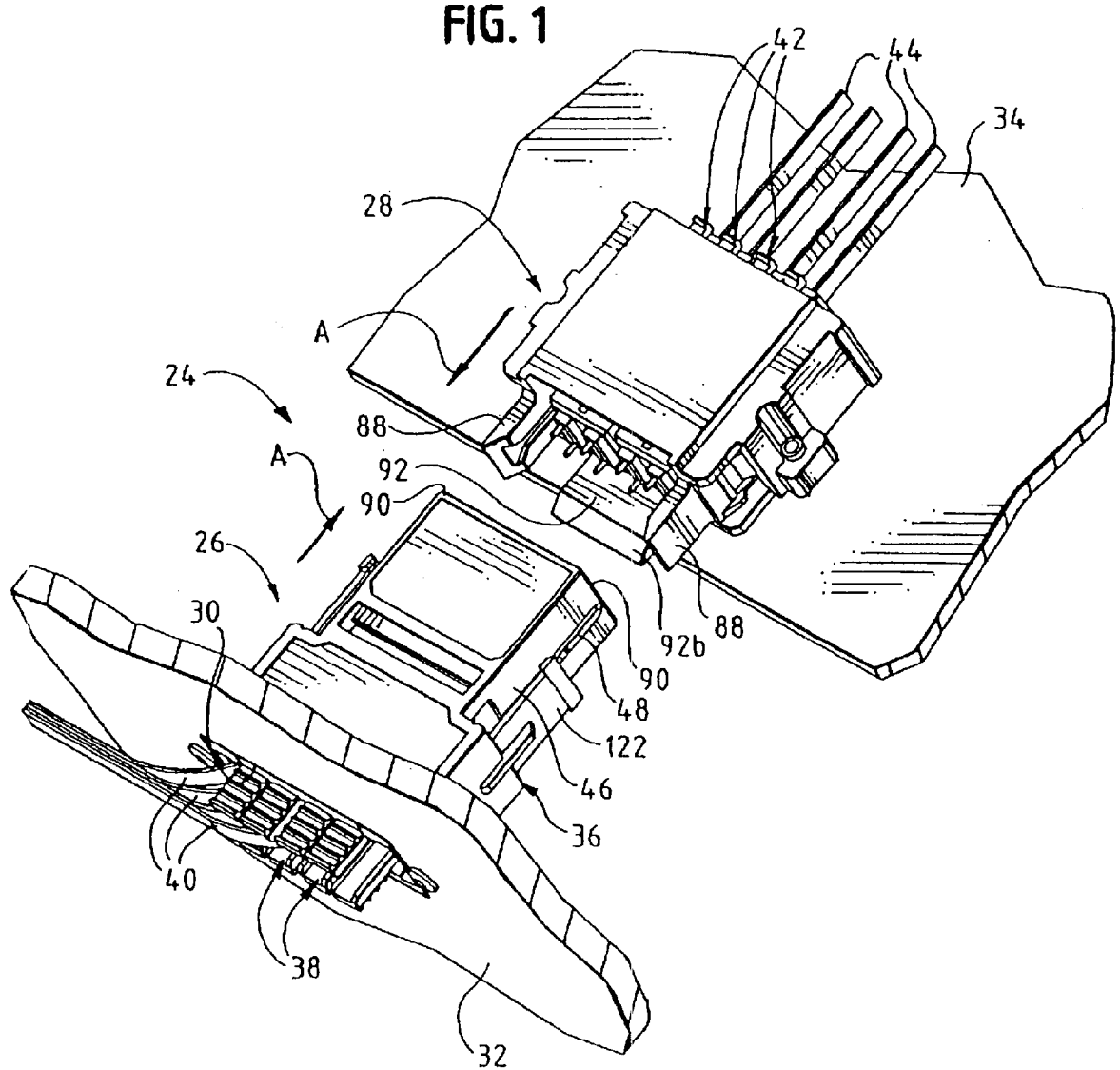
FIG. 1 is a perspective view of a mating connector assembly embodying the concepts of the invention, with the assembly in unmated condition.
Figure 2:
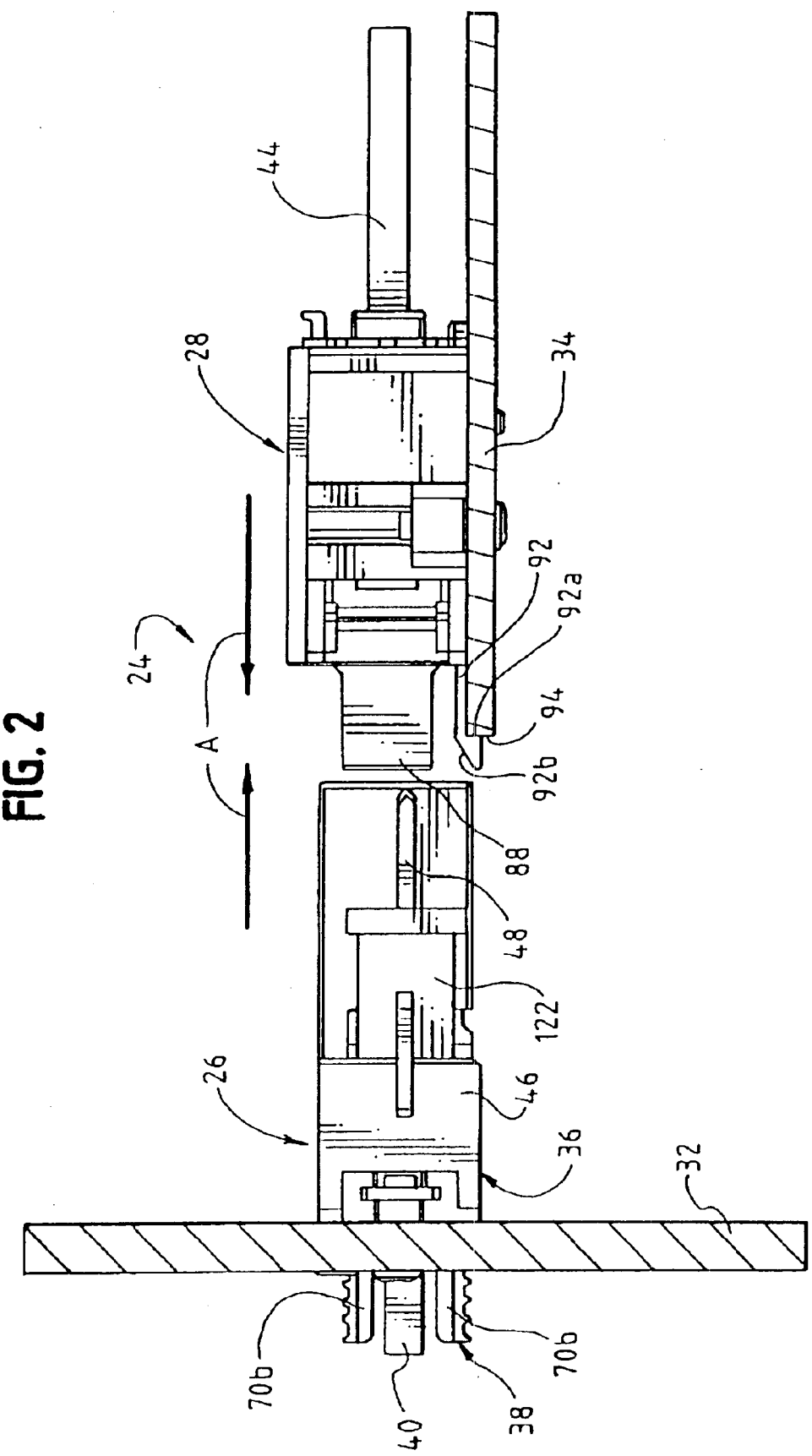
FIG. 2 is a side elevational view of the mating connector assembly as shown in FIG. 1.
Figure 3:
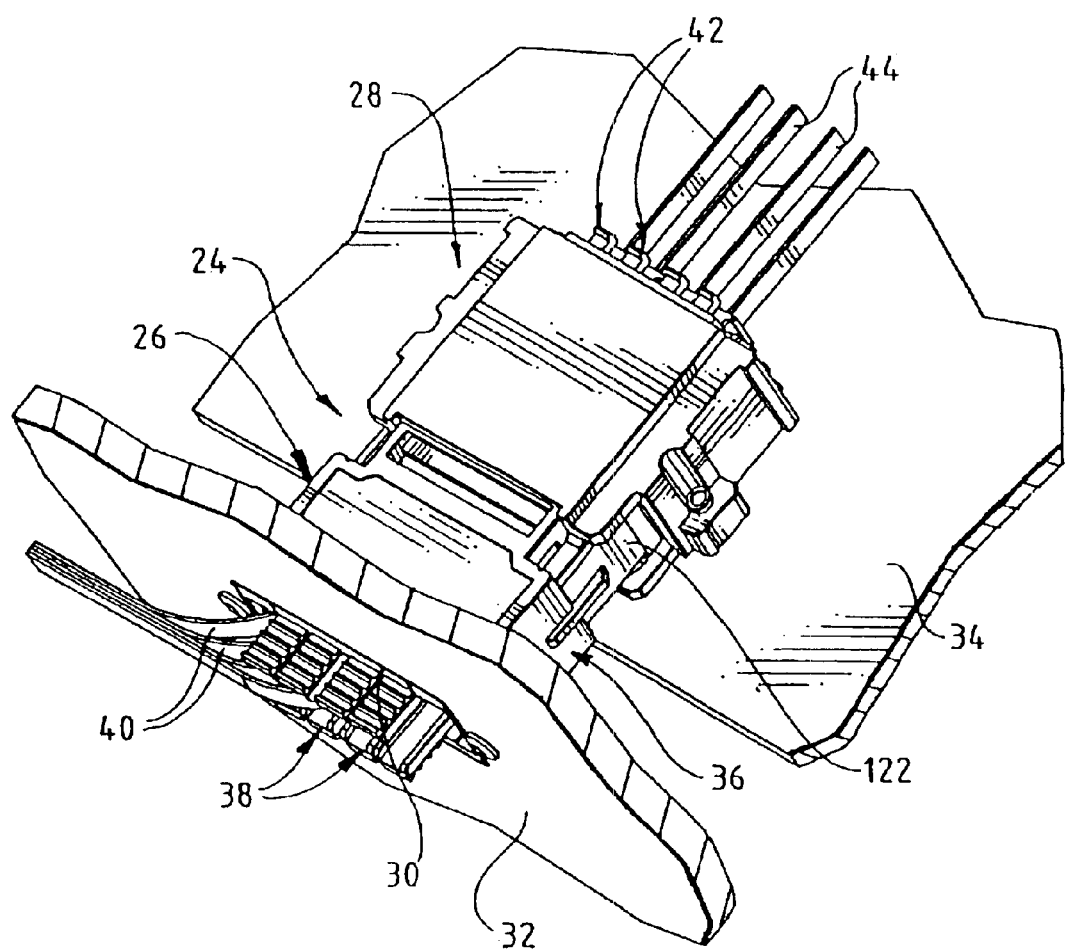
FIG. 3 is a perspective view of the mating connector assembly of FIG. 1, in mated condition.

Referring to the drawings in greater detail, and first to FIGS. 1–3, the invention is embodied in a mating connector assembly, generally designated 24, which includes a backplane connector assembly, generally designated 26, mateable with a daughterboard connector assembly, generally designated 28. The backplane connector assembly is mounted in an aperture 30 in a substrate, panel or backplane which, in the preferred embodiment, is a printed circuit board. Specifically, backplane 32 can be considered the "motherboard" herein. The daughterboard connector assembly is mounted on a top surface of a second printed circuit board 34 which is considered the "daughterboard" herein.

Backplane connector assembly 26 includes an adapter, generally designated 36, which is mounted in aperture 30 in motherboard 32. Four fiber optic connector modules, generally designated 38, are inserted into adapter 36, through aperture 30, from the front of backplane 32. Each fiber optic connector module is terminated to a multi-fiber cable 40. Each cable is a flat or "ribbon" cable having a plurality of optical fibers.

After daughterboard connector assembly 28 is mounted on daughterboard 34, four fiber optic connector modules, generally designated 42, are inserted into the back of the connector housing, as described hereinafter. Each module 42 is terminated to a flat, multi-fiber cable 44 similar to fiber optic cables 40. Backplane connector assembly 26 and daughterboard connector assembly 28 are mateable in the direction of arrows "A" (FIGS. 1 and 2) to a mated condition shown in FIG. 3, wherein the fibers of cables 40 and 44 are functionally connected.

Figure 4:
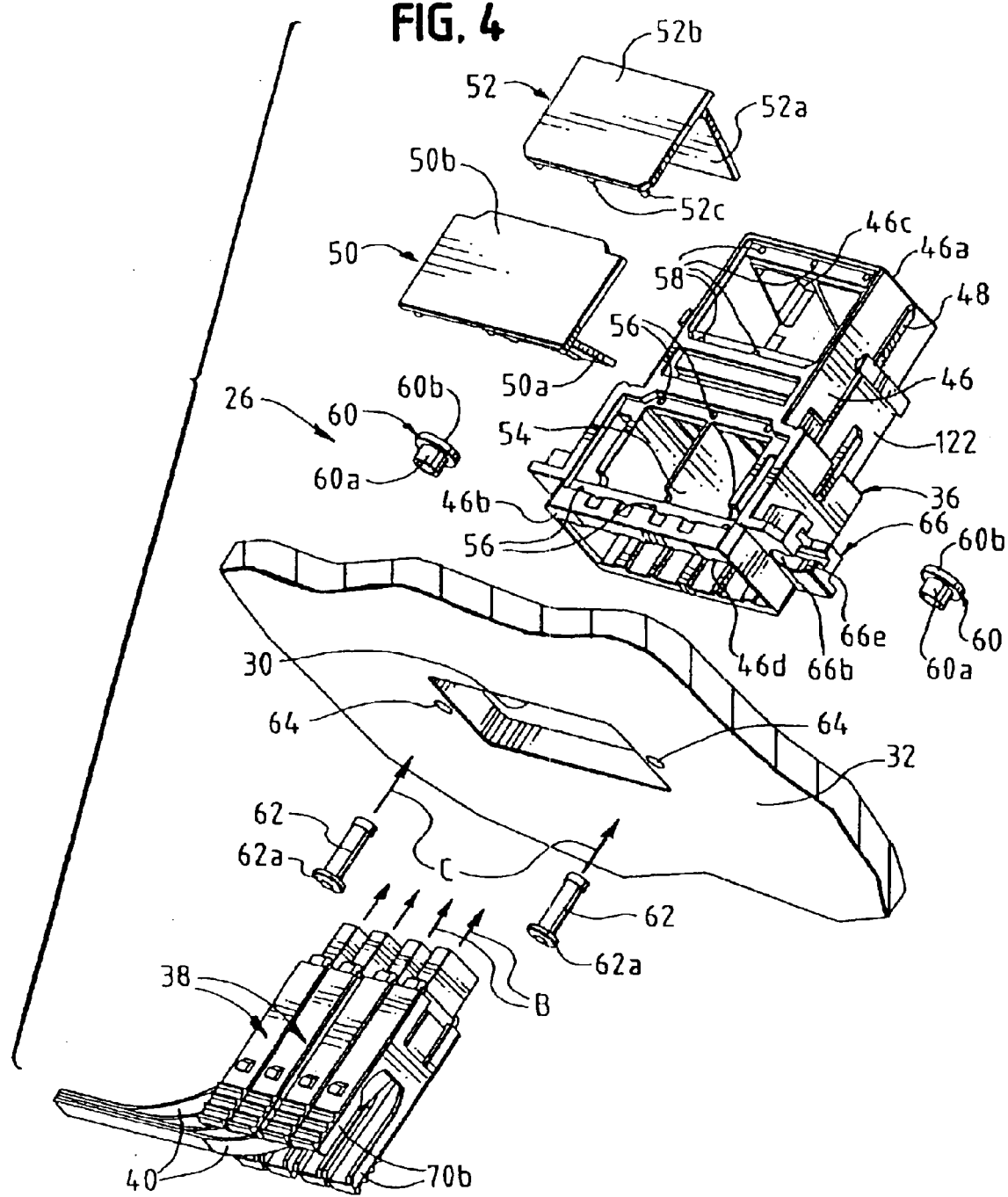
FIG. 4 is an exploded perspective view of the backplane connector assembly as seen to the left in FIGS. 1 and 2.

Referring to FIG. 4, adapter 36 includes a housing 46 which may be fabricated of molded plastic material. The housing defines a front mating end 46a and a rear terminating end 46b. The front mating end is open, as at 46c, and through which the ferrules (described hereinafter) of fiber optic connector modules 38 can project. Terminating end 46b is open, as at 46d, for receiving connector modules 38 in the direction of arrows "B". Housing 46 of adapter 36 has an outwardly projecting alignment rib 48 on each opposite side thereof and extending in the mating direction of the connector assembly, for purposes described hereinafter.

Figure 5:
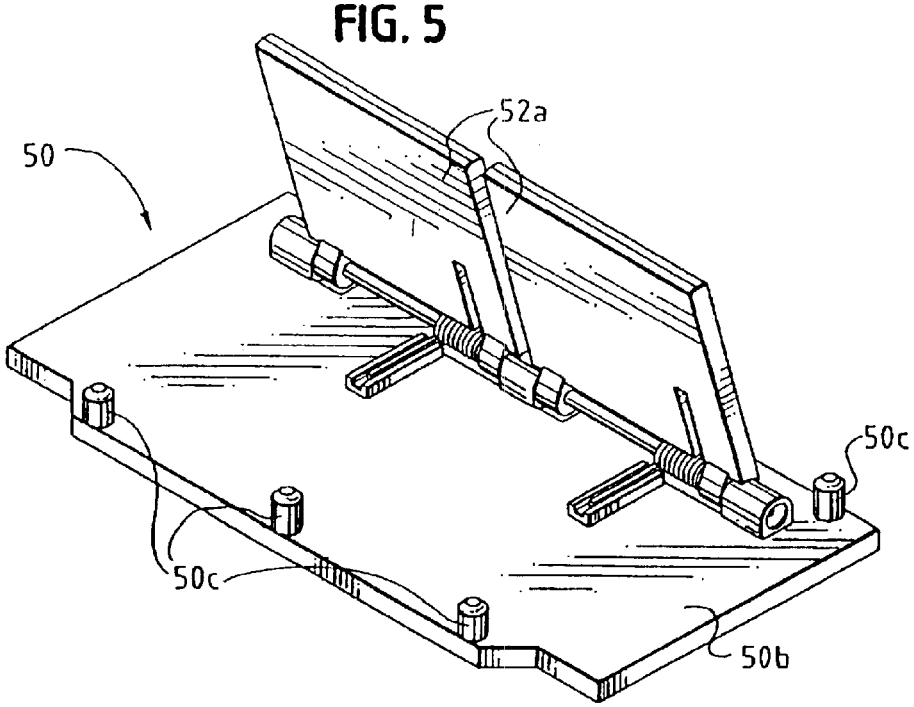
FIG. 5 is a perspective view of one of the shutter assemblies for the adapter in the backplane connector assembly of FIG. 4.
Figure 6:
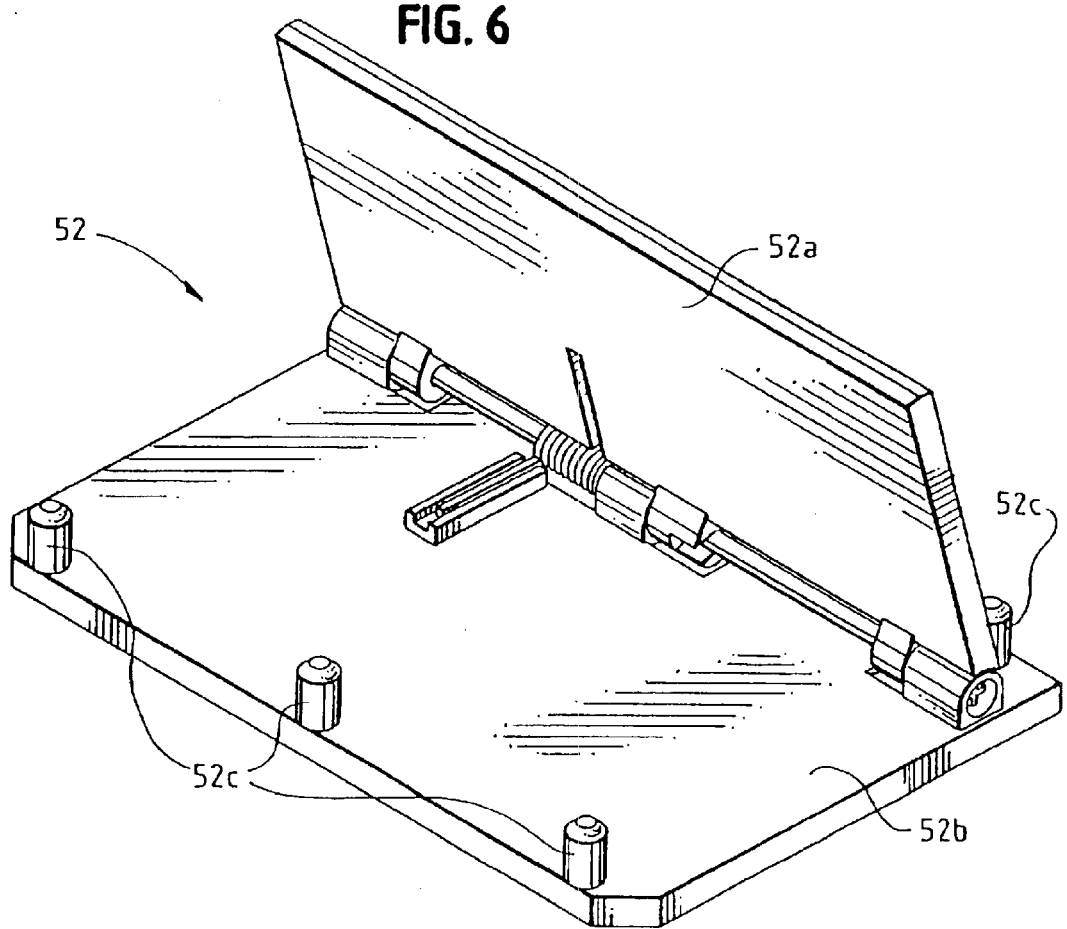
FIG. 6 is a perspective view of the other shutter assembly for the adapter.

FIG. 5 shows a shutter assembly, generally designated 50, for closing opening 46b of adapter 46, and FIG. 6 shows a shutter assembly, generally designated 52, for closing mating opening 46c of the adapter. Shutter assembly 50 includes a pair of spring-loaded shutters 50a which close opening 46d on opposite sides of an interior partition 54 (FIG. 4). The shutter members are pivotally mounted on a plate 50b which includes a plurality of pegs 50c which are press-fit into holes 56 in adapter housing 46. Similarly, shutter 52a of shutter assembly 52 is spring-loaded and is mounted on a plate 52b which has a plurality of pegs 52c which are press-fit into a plurality of holes 58 in adapter housing 46. Shutters 50a and 52a provide dust covers for the interior of adapter 36.

Figure 7:
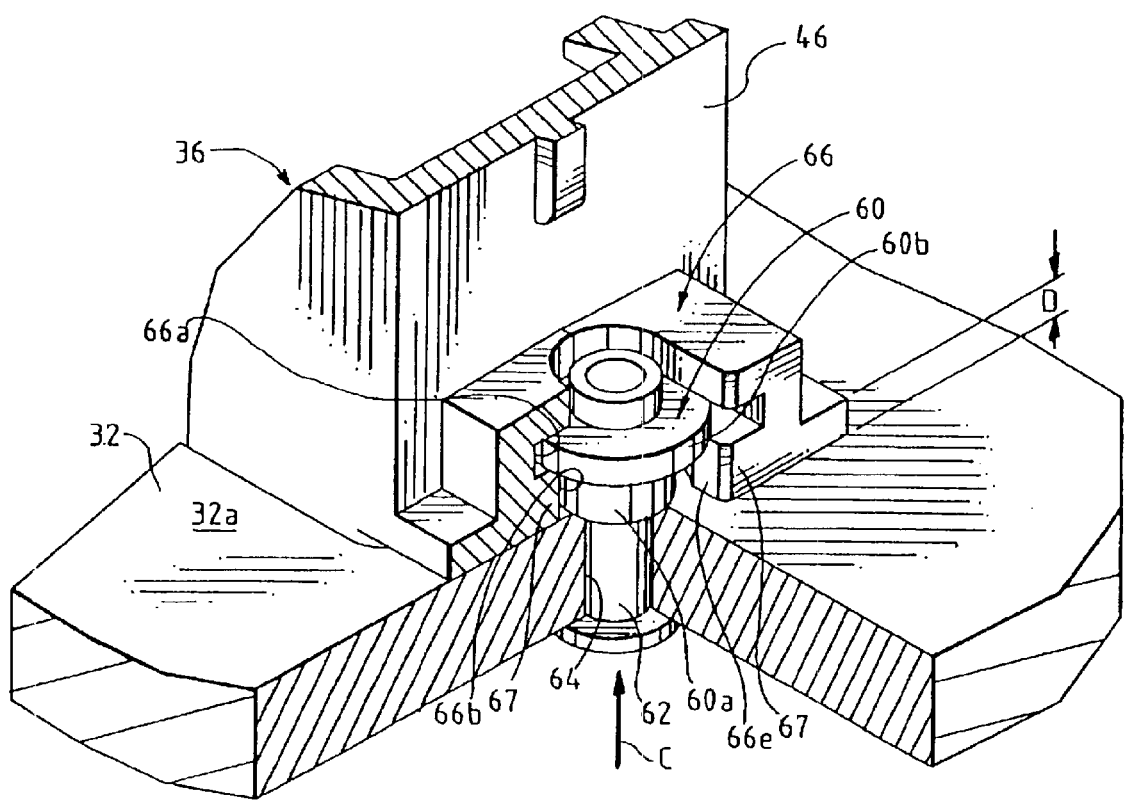
FIG. 7 is an enlarged perspective view, broken away to show the floating mount between the adapter and the backplane in the backplane connector assembly of FIG. 4.

Referring to FIG. 7 in conjunction with FIG. 4, means are provided for mounting adapter 36 to backplane 32 in order to provide relative floating movement therebetween. Specifically, a pair of T-nuts, generally designated 60, are floatingly mounted to adapter 36 and receive a pair of rivets 62 insertable in the direction of arrows "C" through a pair of mounting holes 64 in the backplane. The rivets have enlarged head portions 62a which will engage the surface of the backplane. Mounting holes 64 are spaced on opposite sides of opening 30.

Still further, each T-nut 60 includes a shank portion 60a and an enlarged head 60b. A mounting flange, generally designed 66, is molded integrally with each opposite side of adapter housing 46. Each flange 66 includes an interior cavity 66a which receives head portion 60b of one of the T-nuts 60. A passage 66b extends through flange 66 toward backplane 32 in communication with cavity 66a for receiving shank portion 60a of the T-nut. The following parameters should be understood: (1) the dimensions of head portion 60b are smaller than cavity 66a so that the head portion can float within the cavity, (b) the cross dimensions of shank portion 60a are less than the dimensions of passage 66b so that the shank portion can float within the passage and (c) the length of shank portion 60a is greater than the thickness of a wall portion 67 of flange 66 below the head portion (i.e., the thickness indicated by double-headed arrow "D" (FIG. 7). Therefore, when rivet 62 tightens the T-nut onto surface 32a of backplane 32, the adapter does not become tightened to the backplane and is allowed to float relative thereto. Lastly, passage 66b has a restricted mouth, as at 66e, so that the T-nut can be snap-fit into flange 66 to mount the nut to adapter housing 46. It should be understood that rivet 62 equally could be a threaded fastener, such as a screw, for threadingly engaging the T-nut.

Figure 8:
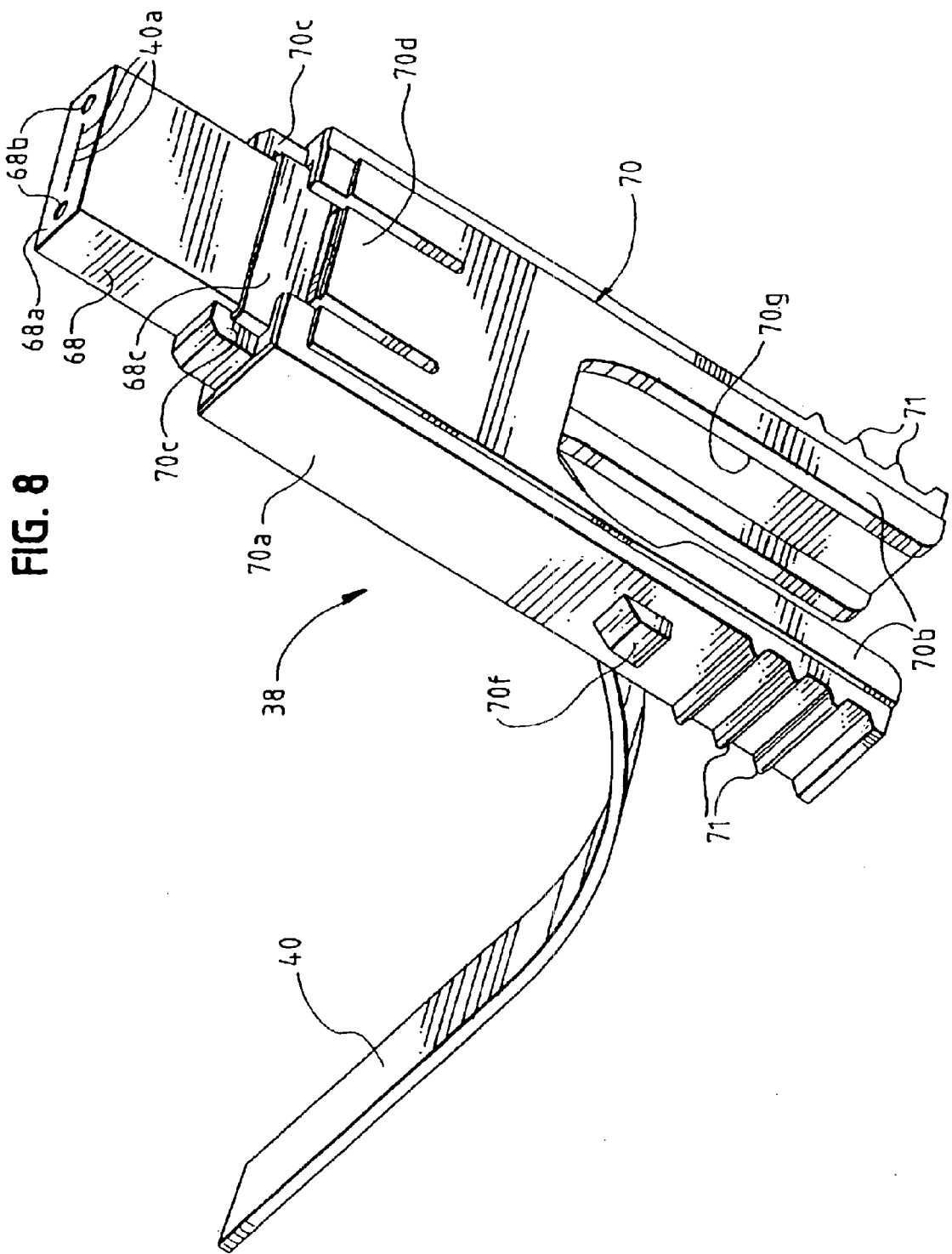
FIG. 8 is a perspective view of one of the fiber optic connector modules of the backplane connector assembly of FIG. 4.
Figure 9:
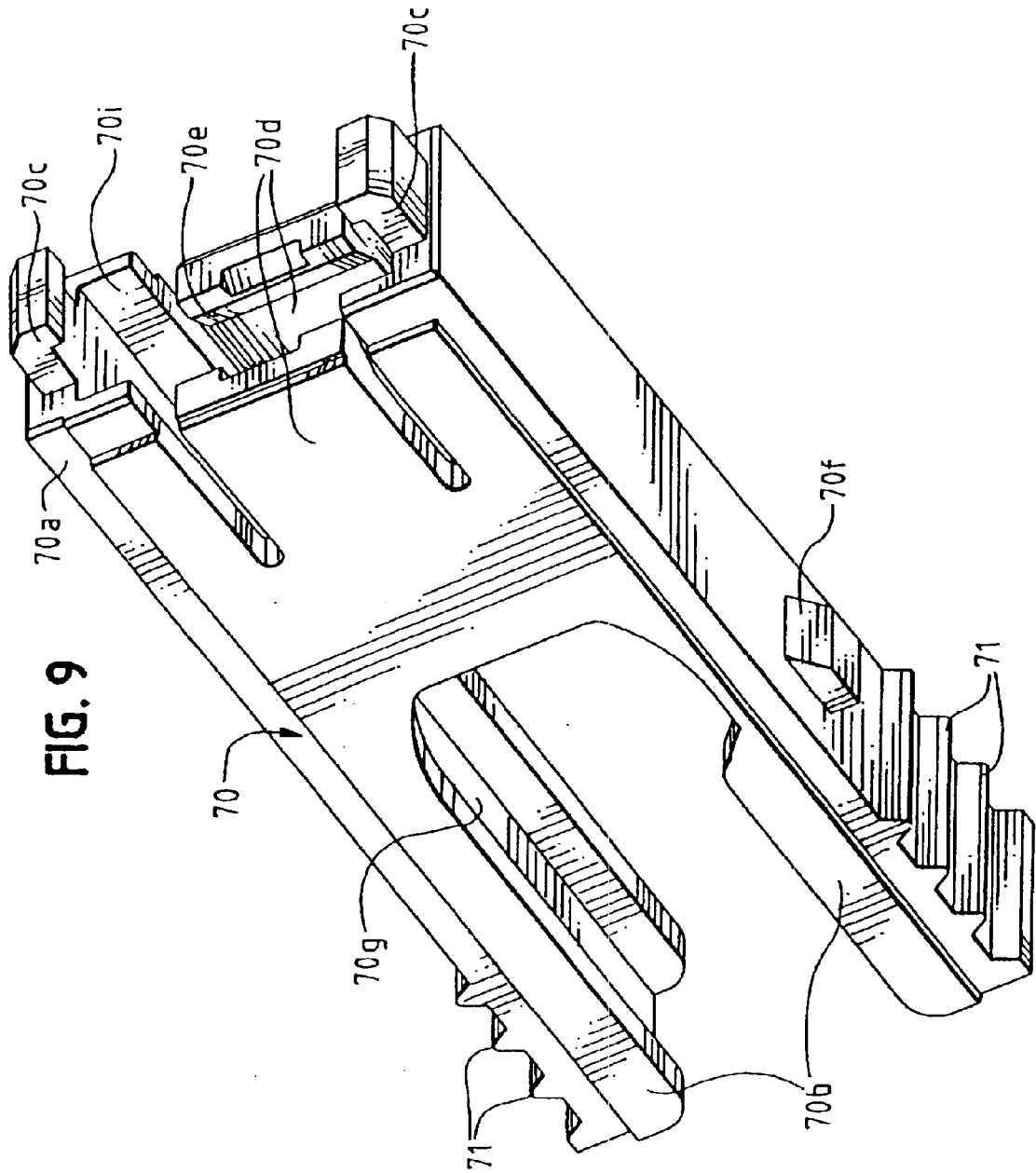
FIG. 9 is a perspective view of the housing of the connector module of FIG. 8.
Figure 10:
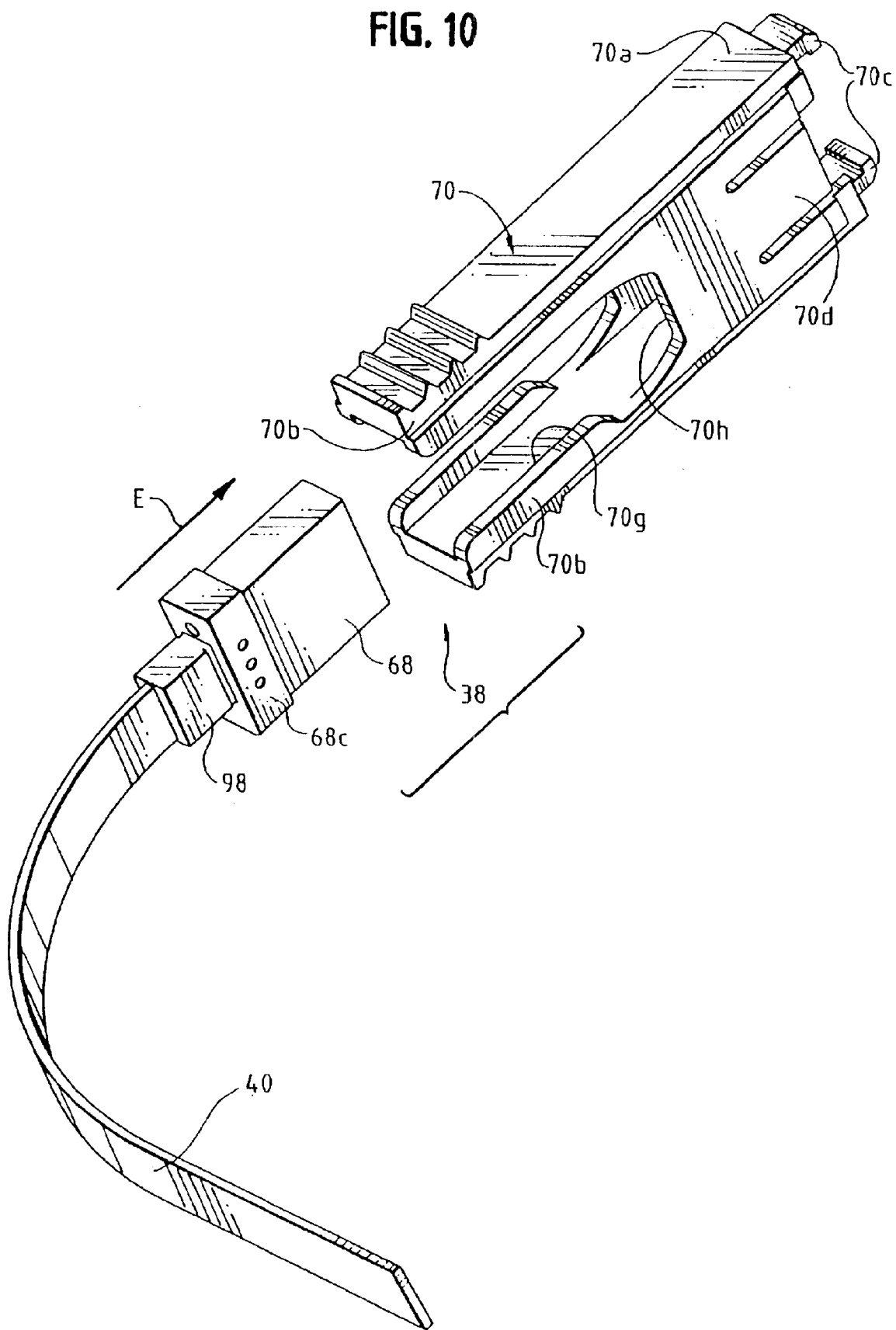
FIG. 10 is a perspective view showing the assembly procedure of the module of FIG. 8.

FIGS. 8–10 show one of the fiber optic connector modules 38 which are inserted into adapter 36 as described above. Specifically, each module 38 includes a ferrule 68 terminated to one of the multi-fiber cables 40 with ends 40a (FIG. 8) of the fibers exposed at a mating face 68a of the ferrule. The ferrule includes a pair of alignment holes 68b opening into mating face 68a. The ferrule is captured by a manually manipulatable housing, generally designated 70, which includes a front portion 70a which actually captures the ferrule, and a rear portion defined by a pair of laterally spaced arms 70b that are graspable between an operator's fingers. FIG. 10 shows that ferrule 68 has a peripheral flange 68c. The front portion 70a of housing 70 includes a pair of forward latch hooks 70c on two opposite sides of the housing and a pair of flexible latch arms 70d on the other two opposite sides of the housing. As seen best in FIG. 9, each latch arm 70d includes an inside chamfered latch hook 70e. Latch hooks 70c engage the front of flange 68c of the ferrule, and latch hooks 70e on latch arms 70d engage the rear edges of flange 68c to hold the ferrule encapsulated within front portion 71 of housing 70.

Still referring to FIGS. 8–10, manually graspable arms 70 include serrations 70e on the outsides thereof to facilitate manual grasping thereof. A latch block 70f projects outwardly from each arm for latching engagement within adapter 36. Each arm 70b also includes an interior channel 70g for guiding ferrule 68 into front portion 70a of the housing.

FIG. 10 shows that ferrule 68 is insertable into housing 70 of connector module 38 in the direction of arrow "E". The ferrule moves within channels 70g of arms 70b and through an open rear end 70h of front portion 70a of the housing. The ferrule becomes latched in a position projecting out of an open front end 70i (FIG. 9) of the housing and is locked in the position shown in FIG. 8, with the ferrule projecting forwardly of the manually manipulatable housing.

Figure 11:
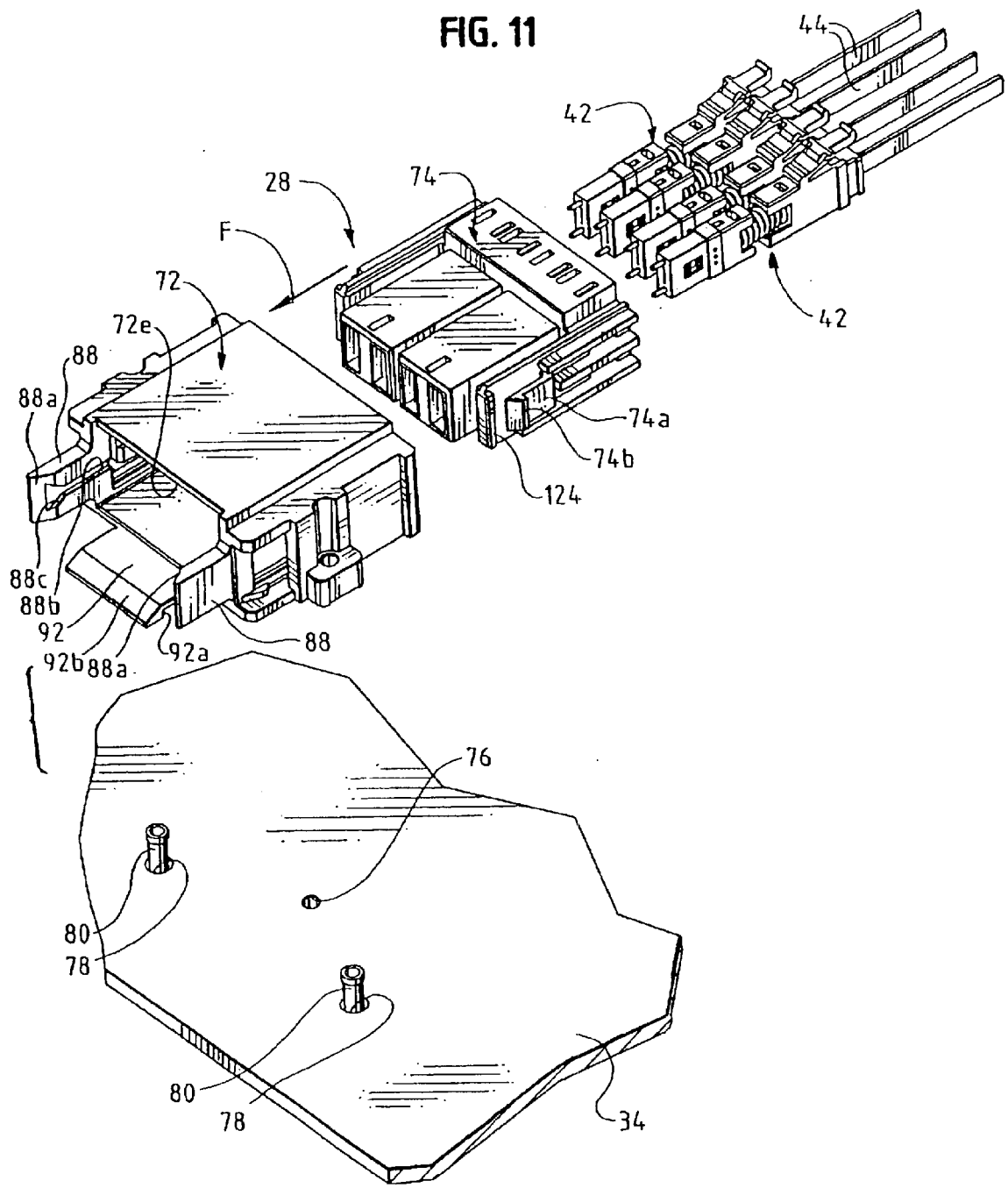
FIG. 11 is an exploded perspective view of the daughterboard connector assembly as seen to the right of FIGS. 1 and 2.
Figure 12:
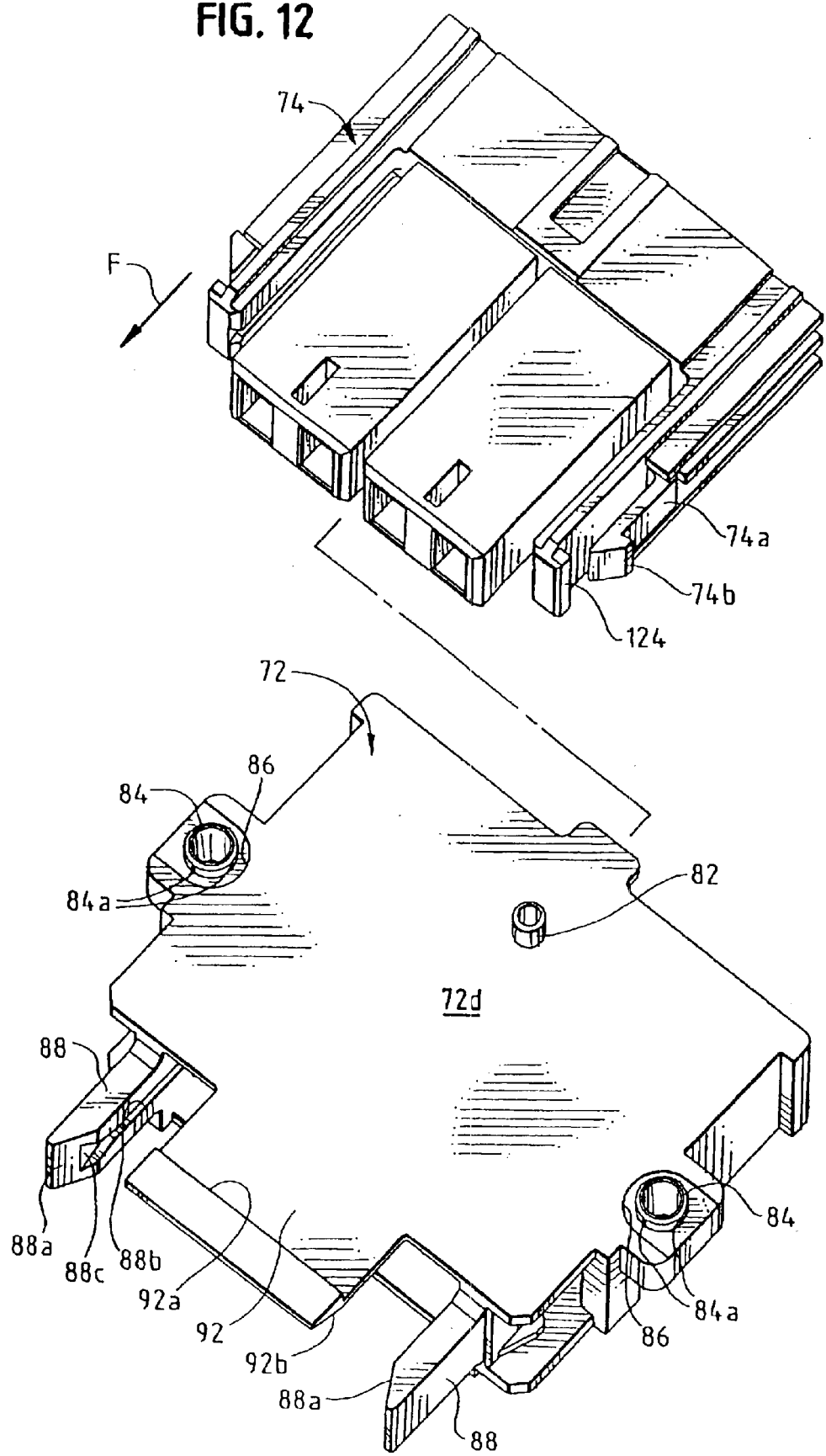
FIG. 12 is an exploded bottom perspective view of the two-part housing of the daughterboard connector assembly.
Figure 13:
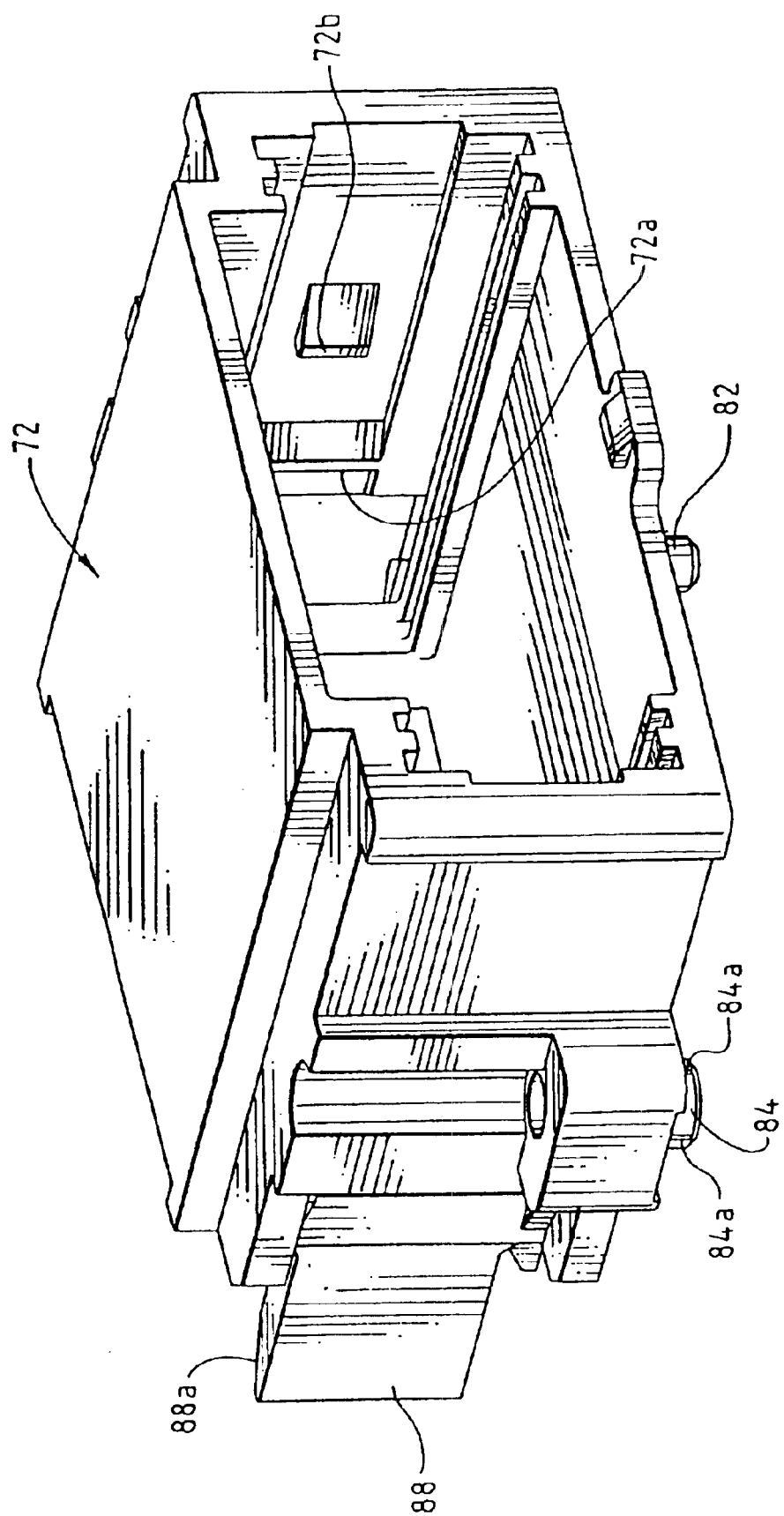
FIG. 13 is a perspective view of the front housing part of the daughterboard connector assembly.

FIGS. 11–13 show daughterboard connector assembly 28 to include a two-part housing defined by a front housing part, generally designated 72, and a rear housing part, generally designated 74. The rear housing part is insertable into the front housing part in the direction of arrow "F" (FIG. 11). Rear housing part 74 has a flexible latch arm 74a with a latch hook 74b which latches behind a front latch shoulder 72a (FIG. 13) when the two housing parts are initially assembled. FIG. 13 also shows a second latch shoulder 72b which is located rearwardly of latch shoulder 72a, for purposes described hereinafter. Each housing part 72 and 74 may be a one-piece structure unitarily molded of dielectric material such as plastic or the like.

Generally, a system is provided for mounting front housing part 72 of daughterboard connector assembly 28 on daughterboard 34 with considerable precision. Specifically, the daughterboard has a pre-placement hole 76 spaced between a pair of positioning holes 78 of as seen in FIG. 11. A pair of rivets 80 are insertable through positioning holes 78. As best seen in FIG. 12, a pre-positioning peg 82 projects downwardly from a bottom surface 72d of front housing part 72 for insertion into pre-placement hole 76 with substantially zero insertion forces. In other words, hole 76 is larger than peg 82. A pair of positioning pegs 84 project downwardly from surface 70d for insertion into positioning holes 78 in daughterboard 34 by a press-fit to precisely fix the housing on the substrate. Peg 82 is solid, but pegs 84 are hollow for receiving rivets 80 therethrough to solidly lock the front housing part to the daughterboard. Pre-placement peg 82 is longer than positioning pegs 84 so that it is easy for an operator to locate and insert pre-placement peg 82 into pre-placement hole 76. The housing then can be easily pivoted about peg 82 until positioning pegs 84 are aligned with positioning holes 78.

Still referring to FIG. 12, positioning pegs 84 are provided with crushable ribs 84a on the exterior thereof and which are crushed or deformed when pegs 84 are press-fit into holes 78. Bottom surface 72d of front housing part 72 is recessed, as at 86, around each positioning peg 84. This recessed area is provided for receiving any plastic material, such as crushable ribs 84a, which might be shaved off of positioning pegs 84 when they are press-fit into positioning holes 78. This ensures that bottom surface 72d of front housing part 72 is mounted flush on the flat top surface of daughterboard 34.

Generally, an alignment system is provided between daughterboard connector assembly 28 and adapter 36 of backplane connector assembly 26. More particularly, as best seen in FIGS. 11 and 12, front housing part 72 includes a pair of alignment flanges 88 at opposite sides of an open mating end 72e of the front housing part. Each flange has an outwardly chamfered or flared distal end 88a which is engageable by the front edges 90 (FIG. 1) of adapter 36 upon mating of the two connector assemblies. In essence, flared distal ends 88a allow for a degree of misalignment between the connector assemblies in an "X" direction generally perpendicular to mating direction "A" (FIG. 1) of the connectors, the "X" direction being generally parallel to daughterboard 34. Alignment flanges 88 have grooves or slots 88b on the insides thereof for receiving alignment ribs 48 (FIG. 1) on opposite sides of adapter housing 46. Slots 88b have flared mouths 88c which are engageable by the distal ends of alignment ribs 48 to allow for a degree of misalignment between the two connector assemblies in a "Y" direction generally perpendicular to mating direction "A" as well as generally perpendicular to the aforesaid "X" direction and daughterboard 44. Therefore, alignment flanges 88, with the outwardly flared distal ends 88a thereof in combination with flared mouths 88c of slots 88b, are unique in utilizing a singular structure to allow for misalignment in two different "X" and "Y" directions.

Referring back to FIG. 2 in conjunction with FIGS. 11 and 12, a bottom flange 92 projects forwardly of front housing part 72 flush with bottom surface 72d (FIG. 12) of the front housing part. The flange has a bottom hook portion 92a and a top chamfered portion 92b. The bottom hook portion overlaps an edge 94 of daughterboard 34. The top chamfered portion 92b is engageable by the front bottom edge of adapter housing 46 to prevent the bottom edge of the housing from "stubbing" the front edge of the daughterboard during mating of the connector assemblies.

Figure 14:
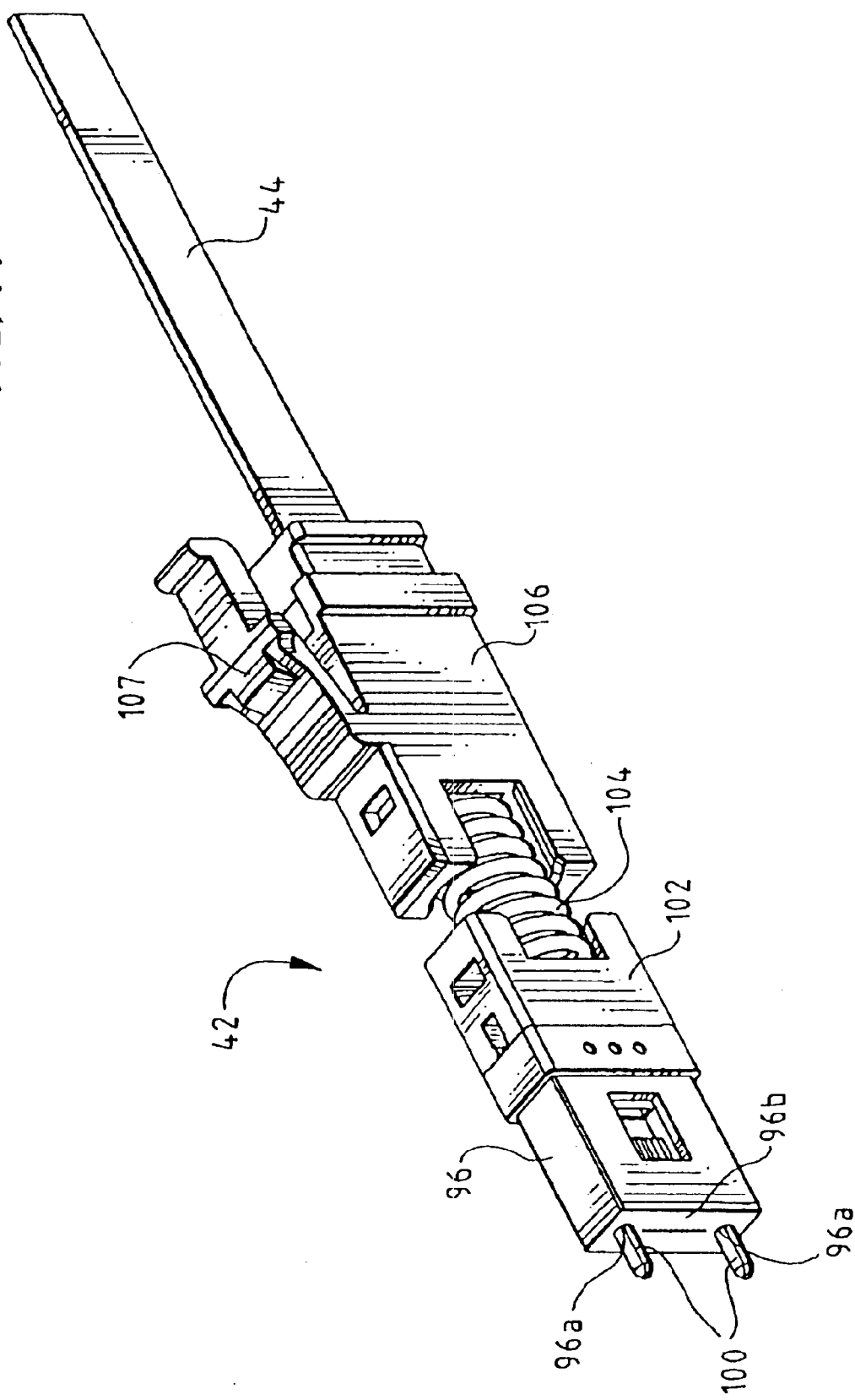
FIG. 14 is a perspective view of one of the fiber optic connector modules of the daughterboard connector assembly of FIG. 11.
Figure 15:
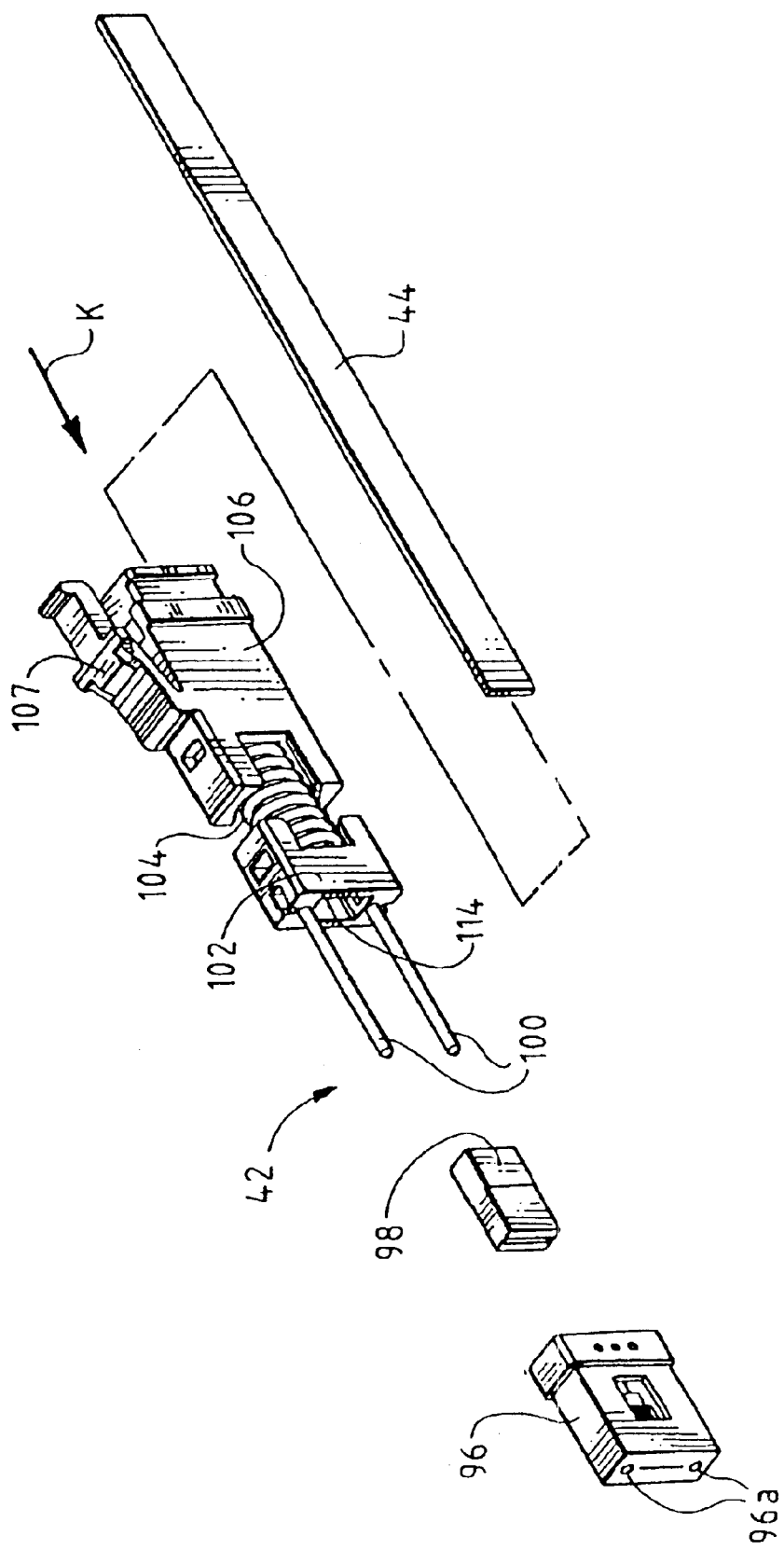
FIG. 15 is an exploded perspective view of the module of FIG. 14.
Figure 16:
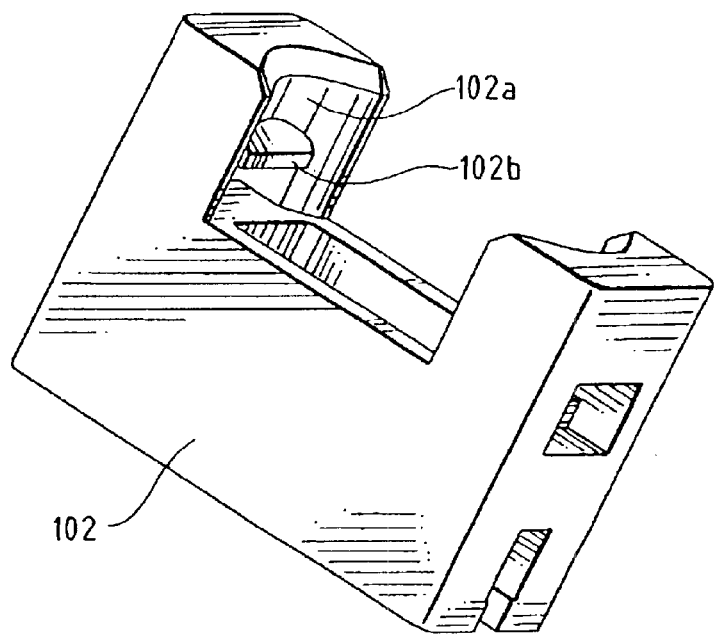
FIG. 16 is a perspective view of the pin keeper of the module of FIG. 14.

FIGS. 14–19 show in greater detail one of the fiber optic connector modules 42 inserted into rear housing part 74 of daughterboard connector assembly 28. Specifically, each module 42 includes a ferrule 96 for terminating multi-fiber cable 44, with a resilient boot 98 providing strain-relief for the cable. The ferrule includes a pair of through holes or passages 96a (FIG. 15) for receiving a pair of alignment pins 100 fixed to a pin keeper 102 which abuts against the rear of ferrule 96 so that the distal ends of alignment pins 100 project forwardly of a front mating face 96b of ferrule 96. A coil spring 104 is fixed to a rear end of pin keeper 102 as described hereinafter, and a spring pusher member 106 is fixed to the rear end of the coil spring. Both pin keeper 102 and pusher member 106 may be fabricated of molded plastic material. An integral, flexible latch arm 107 projects outwardly from the pusher member for latching the fiber optic connector module within rear housing part 74 of daughterboard connector assembly 28. FIG. 16 shows that pin keeper 102 has a receptacle 102a at a rear end thereof for receiving a front end of coil spring 104, along with a locking flange 102b for locking with a coil at the front end of the spring. Although not visible in FIG. 16, one of the locking flanges 102b are disposed at each opposite side of receptacle 102a of pin keeper 102.

Figure 17:
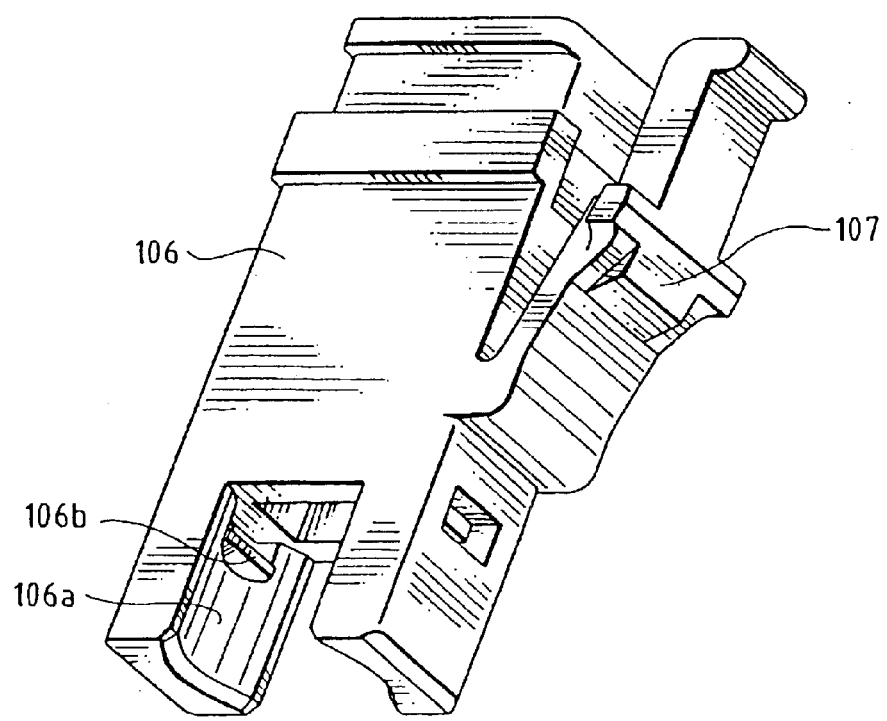
FIG. 17 is a perspective view of the spring pusher member of the module of FIG. 14.

Similarly, FIG. 17 shows pusher member 106 to have a front receptacle 106a at a front end thereof for receiving a rear end of coil spring 104. A locking flange 106b is disposed at each opposite side of receptacle 106a for locking with a coil at the rear end of the coil spring.

Figure 19:
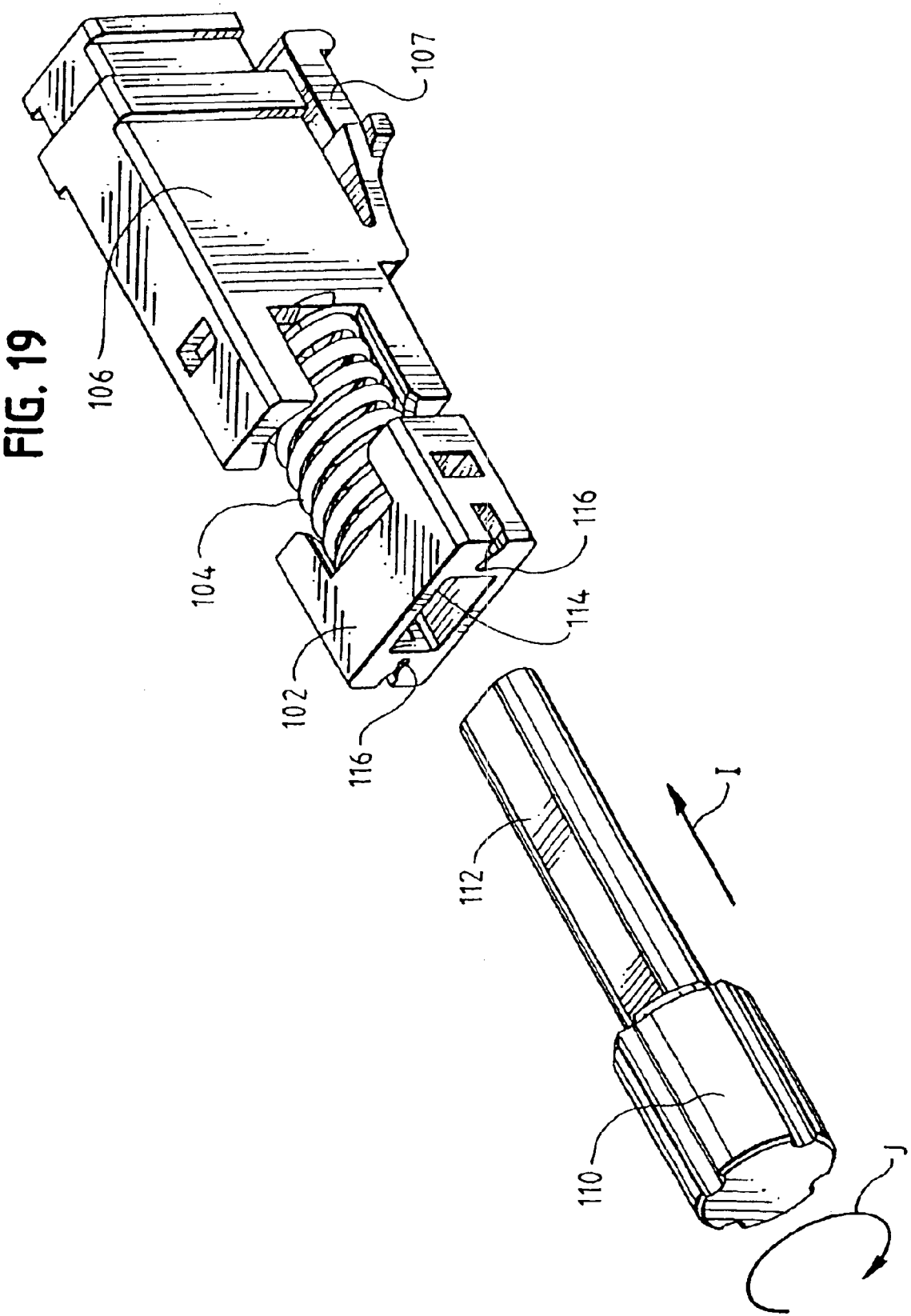
FIG. 19 is a perspective view showing the assembly of the spring to the pusher member of FIG. 17.

FIGS. 18 and 19 show the procedure for assembling coil spring 104 between pin keeper 102 and pusher member 106 and locking the coil spring to those components. It should be noted that coil spring 104 is oval in cross-configuration. A tool 110 has a generally oval shaft 112 for insertion in the direction of arrow "G" into oval coil spring 104. The tool then is rotated in the direction of arrow "H" to effectively rotate the coil spring and cause the front open end coil 104a to lock behind flanges 102b (FIG. 16) of pin keeper 102. This subassembly then is positioned as shown in FIG. 19 so that the opposite open end coil 104b (FIG. 18) is aligned with locking flanges 106b of pusher member 106. Shaft 112 of tool 110 then is inserted in the direction of arrow "I" (FIG. 19) into a rectangular hole 114 in pin keeper 102 and into coil spring 104, and the tool rotated in the direction of arrow "I". This effectively locks the coil spring in position between the pin keeper and the pusher member. Alignment pins 100 then are fixed within slots 116 (FIG. 19) so that they extend from the pin keeper as seen in FIG. 15. Boot 98 then is inserted into opening 114 of the pin keeper; ferrule 96 is positioned onto alignment pins 100; fiber optic cable 44 is inserted into and through the entire assembly in the direction of arrow "K" (FIG. 15); and the alignment pins and cable are epoxied within the ferrule so that an entire self-contained unit is formed as shown in FIG. 14.

Figure 20:
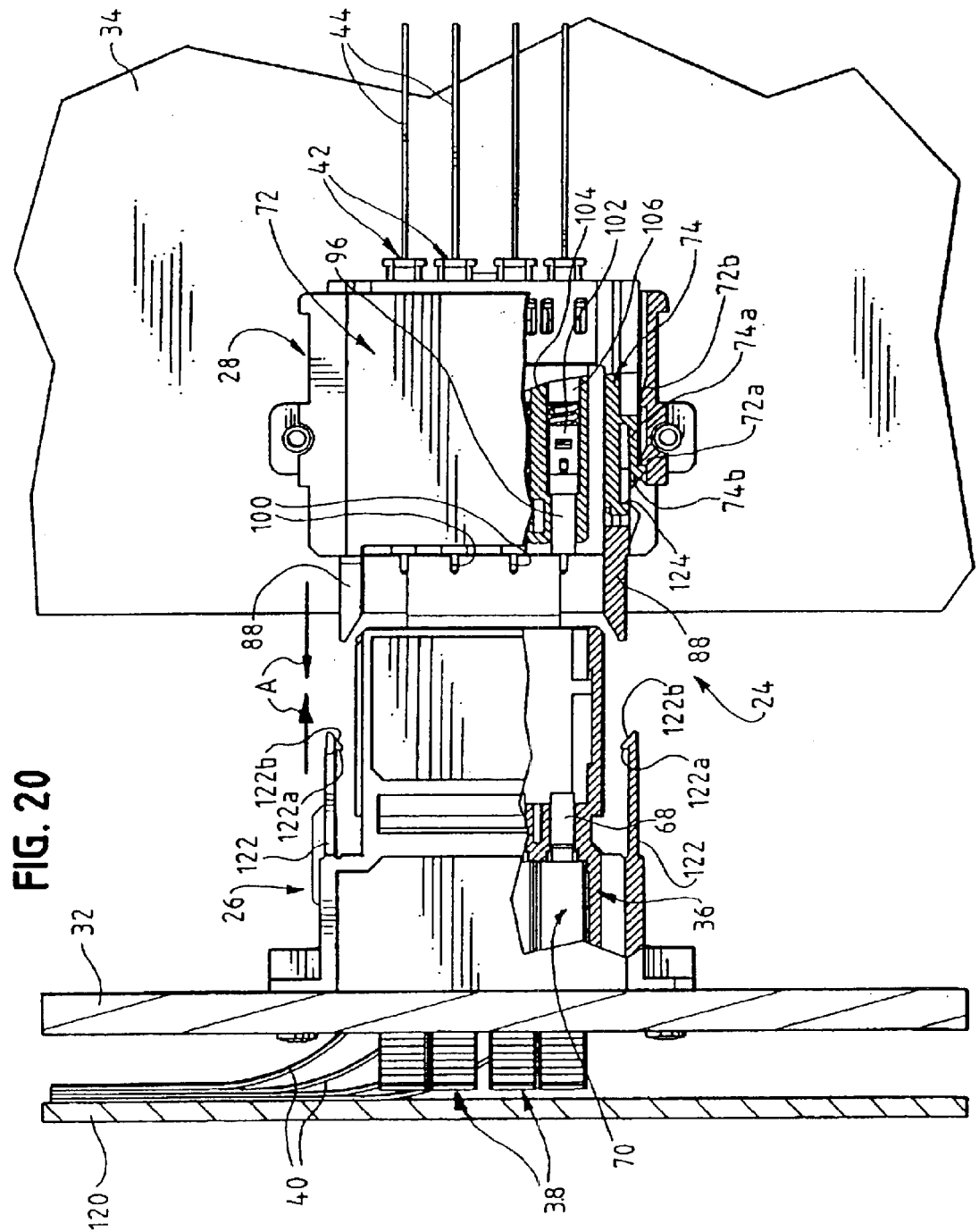

Finally, FIGS. 20–22 show the mating procedure of backplane connector assembly 26 and daughterboard connector assembly 28 in the direction of arrows "A", after the backplane assembly is mounted to backplane or motherboard 32 and after the daughterboard connector assembly is mounted to daughterboard 34. These depictions also show that fiber optic cables 40 are engaged with yet another substrate or board 120. Before proceeding, FIG. 20 best shows that adapter 36 of backplane connector assembly 26 has a pair of actuator arms 122 spaced outwardly from opposite sides thereof. The distal ends of actuator arms 122 are formed with a latch hook 122a and a forwardly facing chamfer 122b.

Backplane connector assembly 26 and daughterboard connector assembly 28 are mateable in a two-step process represented by FIGS. 21 and 22. In the first step, hooks 122a of actuator arms 122 snap behind a pair of preliminary latch shoulders 124 (FIGS. 1 and 20) of rear housing part 74 of daughterboard connector assembly 28. Latch hooks 74b on the ends of latch arms 74a at opposite sides of the rear housing part already have latched behind latch shoulders 72a (FIG. 14) of front housing part 72. This prevents any rearward movement of any part of daughterboard connector assembly 28 in response to the preliminary latching of backplane connector assembly 26 thereto. Further movement of the connectors in the mating direction causes chamfers 122b at the distal ends of actuator arms 122 of adapter 36 to engage the chamfered distal ends of latch arms 74a of rear housing part 74 and move the latch arms out of engagement with latch shoulders 72a. Latch hooks 74b of latch arms 74a now are free to move between latch shoulders 72a and latch shoulders 72b of the front housing part to provide a degree of floating movement between the two housing parts in the "Z" or mating direction. In other words, there is no floating movement between the housing parts in the "Z" direction until full mating occurs with the backplane connector assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector module for securing a ferule terminated to an optical fiber, the fiber optic connector module comprising:
   a manipulable unitarily molded one-piece housing for mounting the ferrule, the housing comprising a front portion from which the ferrule extends and a rear portion extending rearwardly of the front portion for manual gasping by an operator, the front portion having an open front end through which a mating end of the ferrule projects and an open rear end through which the optical fiber extends;
   a pair of laterally spaced arms graspable between an operator's fingers extending from the rear portion of the housing;
   a channel formed on the inside of each laterally spaced arm, the channel extending generally in a front-to-rear direction; and
   an outwardly extending locking protrusion on the outside of said housing for latching the module in a complementary receptacle, wherein the locking protrusion is formed on one of the laterally spaced arms and wherein one of the laterally spaced arms includes an indentation for increasing flexibility of the arm relative to the other arm.

2. The fiber optic connector module of claim 1, wherein the outside of each arm comprises at least one serration.

3. The fiber optic connector module of claim 1, including retainers on said front portion of the housing for capturing the ferrule.

4. The fiber optic connector module of claim 1, wherein the channel is configured to guide the insertion of the ferrule into the open rear end of the front portion.

5. The fiber optic connector module of claim 1, wherein the channel is configured to minimize contact between the laterally spaced arms and the optical fibers located therebetween when the laterally spaced arms are flexed.

6. The fiber optic connector module of claim 1, wherein the indentation is opposite the locking protrusion for enabling the locking protrusion to be more easily disengaged from the complementary receptacle.

7. The fiber optic connector module of claim 6, wherein the indentation is a cutout of irregular depth formed in the channel of the laterally spaced arm such that the degree of flexibility along the laterally spaced arm is variable based on the depth of the cutout.

8. The fiber optic connector module of claim 1, wherein the outside of each arm comprises at least one serration.

9. A fiber optic connector module, comprising:
   a unitarily molded housing for mounting a fiber optic ferule terminated to an optical fiber, the housing comprising a front portion and rear portion;
   an opening in the front portion through which the ferrule extends;
   a pair of laterally spaced arms graspable between an operator's fingers extending from the rear portion of the housing, wherein one of the laterally spaced arms includes an indentation for increasing flexibility of the arm relative to the other arm for enabling the locking protrusion to be more easily disengaged from the complementary receptacle;
   an opening in the rear portion through which the optical fiber extends; and
   a channel formed on the inside of each laterally spaced arm, the channel extending generally in a front-to-rear direction.

10. The fiber optic connector module of claim 9, wherein the outside of each arm comprises at least one serration.

11. The fiber optic connector module of claim 9, including a locking protrusion on the outside of said housing for latching the module in a complementary receptacle.

12. The fiber optic connector module of claim 9, wherein the channel is configured to guide the insertion of the ferrule into the open rear end of the front portion.

13. The fiber optic connector module of claim 9, wherein the indentation is a cutout of irregular depth formed in the channel of the laterally spaced arm such that the degree of flexibility along the laterally spaced arm is variable based on the depth of the cutout.

14. A method for securing a ferule terminated to an optical fiber in a fiber optic connector, the method comprising the steps of:
   forming a housing having an open front end and an open rear end;
   forming a pair of laterally spaced arms extending from the rear portion of the housing for grasping between an operator's fingers;
   forming a channel extending generally in a front-to-rear direction on the inside of each laterally spaced arm;
   forming an indentation on one of the arms for increasing flexibility of the one arm relative to the other arm for enabling the locking protrusion to be more easily disengaged from the complementary receptacle; and mounting the ferule to the open front end of the housing such that the ferrule extends outwardly from the open front end and the optical fiber extends outwardly from the open rear end of the housing.

15. The method of claim 14 further comprising the step of forming at least one raised edge on the outside of each arm.

16. The method of claim 14 further comprising the step of forming a locking protrusion on the outside of the housing for latching the module in a complementary receptacle.

17. The method of claim 14 further comprising the step of guiding the insertion of the ferrule into the open rear end of the front portion using the channels.

18. The method of claim 14 further comprising the step of enabling variable flexibility along the laterally spaced arm based on the depth of the indentation, wherein the indentation is a cutout of irregular depth.

19. A fiber optic connector module for securing a ferrule terminated to an optical fiber, the fiber optic connector module comprising:

a single-piece housing having a front portion from which the ferrule extends and a rear portion extending rearwardly of the front portion for manual grasping by an operator, the front portion configured to support a mating end of the ferrule and an open rear end through which the optical fiber extends, the rear portion configured to facilitate secure grasping of the connector;

a pair of laterally spaced arms graspable between an operator's fingers extending from the rear portion of the housing, wherein one of the laterally spaced arms includes an indentation for increasing flexibility of the arm relative to the other arm; and an outwardly protruding latch block formed on one or more of the arms for creating a latching engagement within an adapter when the connector is inserted into the adapter.

20. The fiber optic connector module of claim 19, including retainers on said front portion of the housing for capturing the ferrule.

21. The fiber optic connector module of claim 19, wherein the channel is configured to guide the insertion of the ferrule into the open rear end of the front portion.

22. The fiber optic connector module of claim 19, wherein the channel is configured to minimize contact between the laterally spaced arms and the optical fibers located therebetween when the laterally spaced arms are flexed.

23. The fiber optic connector module of claim 19, wherein the indentation is opposite the locking protrusion for enabling the locking protrusion to be more easily disengaged from the complementary receptacle.

24. The fiber optic connector module of claim 19, wherein the indentation is a cutout of irregular depth formed in the channel of the laterally spaced arm such that the degree of flexibility along the laterally spaced arm is variable based on the depth of the cutout.

* * * * *